United States Patent Office 3,429,775
Patented Feb. 25, 1969

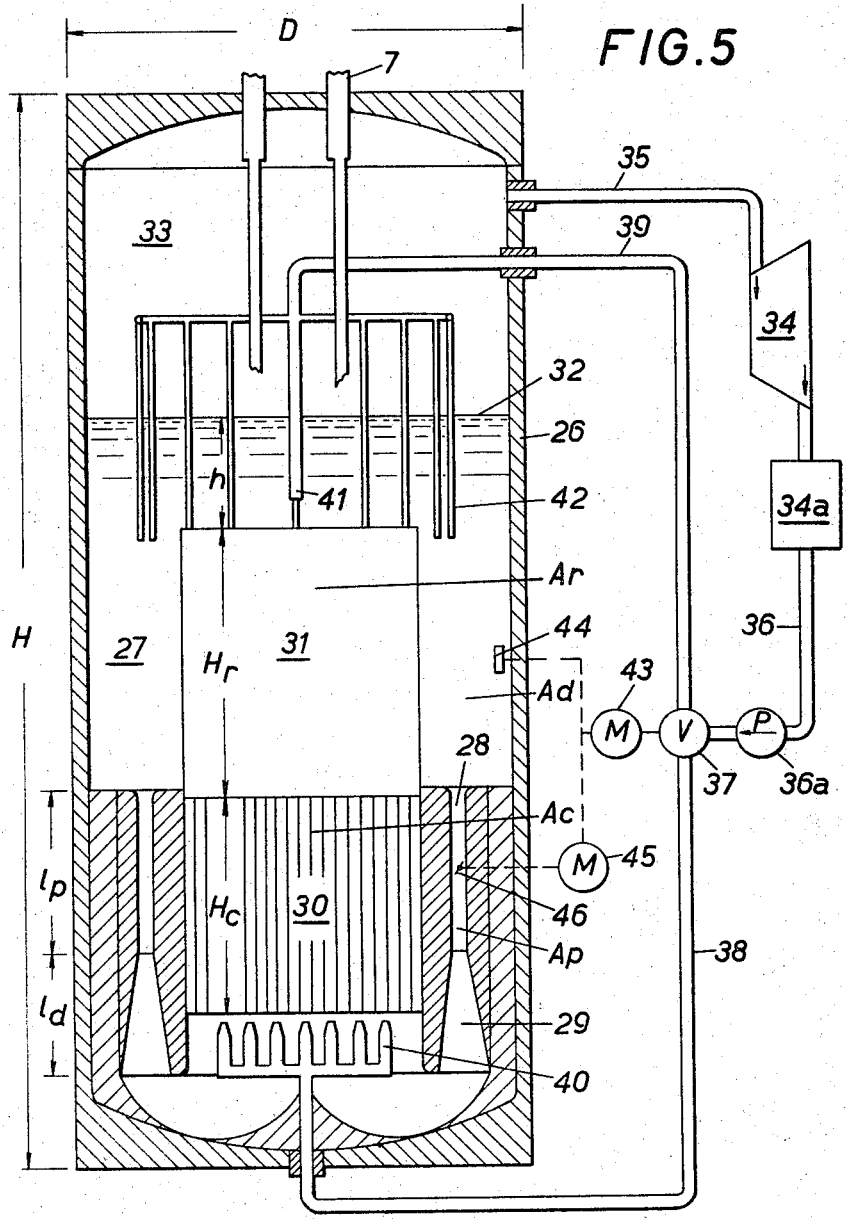

3,429,775
NUCLEAR REACTOR
Eirik Nicoll Petersen, Kjeller, Norway, assignor to
Institutt for Atomenergi, Kjeller, Norway
Filed June 17, 1966, Ser. No. 558,389
Claims priority, application Norway, June 17, 1965,
158,538
U.C. Cl. 176—54        11 Claims
Int. Cl. G21c 15/22

ABSTRACT OF THE DISCLOSURE

This invention relates to nuclear reactors and means for maintaining a uniform flow of circulating cooling fluid through the core.

This is accomplished by a restricted flow section in the downcomer in the reactor.

---

The present invention relates to nuclear reactors in which great variations occur in the specific volume of coolant, such as for instance in reactors with a boiling cooling liquid. The intent of the invention is to obtain a stabilized coolant flow. In particular, the invention aims at an improved control of the dynamic characteristic of a boiling water reactor, by stabilization of the water-vapour flow through the reactor core.

In a stationary nuclear reactor with a boiling cooling liquid, the circulation in the reactor tank will be influenced by the reactor power and the temperature of the liquid supplied to the reactor from the heat exchange circuit. In a marine reactor, the circulation will also vary with the accelerations to which the ship is exposed due to the sea waves. In turn, the circulation will affect the liquid density and, thereby, the reactor power. Consequently, there is a feed back system, including the reactor power, the circulation, the liquid density and the reactor power, a system which may give rise to coupled oscillations and instability. Even if the reactor operation is stable per se, the power swings due to external disturbing influences, such as accelerations in a heaby sea, may become so great that the reactor power might be reduced.

The dyanmic behaviour of boiling water marine reactors has been described previously, for instance, in paper 748 at the Third United Nations International Conference on the Peaceful Use of Atomic Energy, held in Geneva in 1964.

The operation of a marine reactor has to be stable under all conditions, i.e. swings in reactor power caused by disturbing effects have to be checked. In addition to having a stability margin sufficiently large to keep the power swing amplitudes within safe levels, the reactor must also be able to react on control signals for changes in power with a velocity sufficient to make the ship manageable.

The present invention is generally applicable to nuclear reactors having great variations in specific volume of coolant. However, the best results are obtained when the invention is applied to boiling water reactors with natural water circulation, although it would be of great advantage when applied to boiling water reactors having forced circulation.

The object of the present invention primarily is to provide means to check the disturbing effects on the operation of a marine reactor due to accelerations in a heavy sea.

One further purpose of the present invention is to provide means for so influencing the fluid flow as to satisfactorily stabilise the same in all the ranges of frequencies of the disturbances to which a marine reactor is subjected.

According to the invention, a stabilized flow of coolant fluid circulating in a closed circuit through the reactor core of a nuclear reactor is achieved by so choosing the length and/or the flow section of a passage so that the passing time of the fluid through the downcomer is reduced, i.e., the linear flow velocity of the fluid in the said passage is increased relatively to the linear flow velocity of the fluid in the core.

Structurally, this may, in accordance with the invention, be achieved by including in the downcomer of a closed coolant circulation circuit a riser adjoining the nuclear core, a passage of restricted flow section.

In such an arrangement, the natural feedback effect of the liquid flow is utilised to cause a rapid stabilization of the fluid flow in the circuit. When a normal acceleration occurs it entails an increased fluid circulation and consequently an increased reactor power and an increased vapour production, the vapour volume in the core will also increase, and the consequence is that the reactor power will decrease after a time delay corresponding to the passing time of the fluid through the downcomer. By reducing the passing time, this correcting feedback may be sufficiently rapid as to check any increase in the reactor power due to an increase in the acceleration.

According to another feature of the invention, the flow section of the restricted passage is automatically adjusted depending upon the linear velocity of the flow in the downcomer. Thus, when the circulation in the circuit increases due to an acceleration increase, a reduction of the flow section of the passage will decrease the circulation. In this manner, a constant fluid velocity may be maintained in the core in spite of the variations in gravity and acceleration to which a marine reactor is subjected. Such adjustments of the flow section of the restricted passage, may easily be effected by means of an adjustable valve or a flap.

In order to facilitate the adjustability, the restricted passage may be formed by a number of narrow passages disposed along a circle around the reactor core.

According to a still further feature of the invention, cavitation or so-called flashing is utilised to automatically restrict the fluid velocity in the downcomer. As known, flashing occurs in a liquid when the static pressure in the liquid becomes less than the saturation vapour pressure at the prevailing temperature. According to the invention the flow section of one local section of the entire or of part of the restricted passage is so chosen that the acceleration of the coolant is of just such a value that the accompanying reduction of the static pressure in the passage as a whole, is sufficient to cause the static pressure at the local section to be less than the saturation vapour pressure at the prevailing temperature. Ordinarily, flashing is not to occur in the passage, but flashing will occur if the flow velocity surpasses the value which corresponds to the velocity under ordinary conditions. In this way, the velocity increase is counter-acted.

If the flow velocity increase is so great that flashing occurs, this would entail periodical blocking of the flow through the passage and an uneven or pulsing flow in the circuit. Such a flow, in which the velocity varies with the time, may be avoided by preventing that the total flow section of the restricted passage be subjected to pulsation. According to the invention, this may be effected by forming the restricted passage as a number of narrow passages of different flow section. By so causing the flashing to occur over a fraction of the total flow section only, the strong pulsation which might otherwise occur, may be damped down to soft oscillations and in this manner the flashing may be kept under control.

In addition to the features mentioned, the invention may also take benefit of other stabilizing effects, as indicated below.

It is previously known to supply an adjusted quantity of a relatively colder fluid to the core of a nuclear reactor from an external heat exchange circuit in relation to the variations in acceleration to which the nuclear reactor is subjected. Thus, by means of, for instance, gravity influenced valves the decrease in vapour content in the core caused by increased circulation due to an acceleration increase may be compensated for by a reduction of the quantity of relatively colder fluid supplied to the core. Thereby a comparatively greater quantity of warmer fluid is permitted to flow from the downcomer into the core counteracting the decrease in vapour content. Correspondingly, an acceleration decrease is accompanied by an increase in relatively colder fluid supply to the core.

Such an adjusted supply is, however, encumbered with the inconvenience that the introduction of relatively colder liquid into the system disturbs the heat balance and causes pressure variations in the reactor tank. However, it is known that the pressure in a vapour filled space may be varied by spraying a relatively colder liquid into the space. According to the invention, this fact is utilised to overcome the inconvenience of an adjusted introduction of colder liquid into a reactor core.

Thus, according to the invention, the fluid circulating through the core of a nuclear reactor may be further stabilized by admixing the fluid, after it has been forced through the restricted passage, with an adjusted quantity of return fluid from an external heat exchange circuit, a quantity which is decreased with increased fluid velocity in the downcomer and increased with decreased fluid velocity in the downcomer. At the same time a vapour space in the nuclear reactor is supplied with such part of the return fluid which is not supplied at the inlet to the core. In this manner a practically constant pressure is obtained in the nuclear reactor tank under gravity variations.

Such a stabilization may, by way of example, be obtained by means of a gravity sensitive valve which is arranged in the fluid supply from the heat exchange circuit back to the reactor tank, and which also communicates with the vapour space of the reactor tank.

Such an adjusted introduction of return fluid into the core and, in dependence thereof, introduction of return fluid into a vapour space above the core, is particularly well suited for the stabilization of a nuclear reactor, in the case when the adjusted introduction into the core is combined with a forced introduction of fluid into the core by means of injector systems. In a system having natural circulation, the circulation velocity is determined by the rising force of the vapor bubbles in the circulating fluid. By means of injectors, the circulation velocity is increased, and the circulation is determined both by the vapour bubbles and the pressure of the injected fluid. If the rising force of the vapour bubbles is influenced under acceleration variations, the application of injectors will reduce the resulting circulation velocity variations to a degree corresponding to the ratio of the vapour bubble pressure and the pressure of the injected fluid. In this manner there is obtained both an indirect control of the circulation by means of the vapour content in the core, and a direct control of the circulation by means of the pressure of the injected fluid.

During circulation variations fluid may be introduced in the circulation path at the top of the riser instead of being introduced into the vapour space above the core, where the coolant is passing towards the vapour space, in order to actuate the vapour bubbles included in the same. In this manner, a constant vapour pressure is obtained by adjusting the vapour condensation in the vapour bubbles, instead of in the vapour space.

In a boiling water nuclear reactor, wherein fluid from the heat exchange circuit is introduced at the bottom of the reactor tank, it may occur that part of the vapour generated is entrained by the fluid into the downcomer of the tank instead of ascending into the vapour space, whereby the rising force of the vapour bubbles in the reactor core is reduced and thereby the circulation retarded. According to a further feature of the invention part of the return fluid from the heat exchanger, in addition to being fed to the vapour space, is fed to the inlet of the downcomer.

FIGURE 5 is a vertical sectional view, similar to that of FIGURE 1, but illustrating another embodiment of the means according to the invention.

Figure 1:
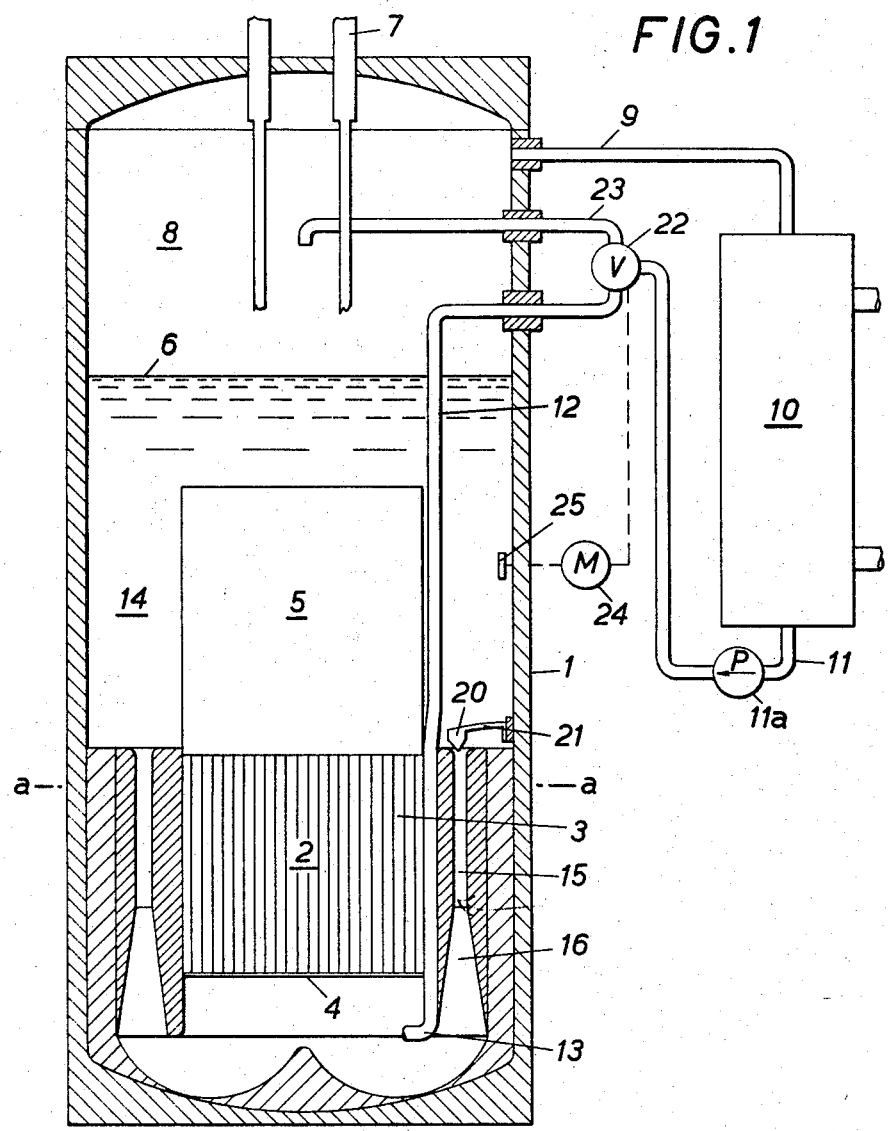
FIGURE 1 is a vertical sectional view of a boiling water reactor illustrating stabilizing means according to the invention.

In FIG. 1, 1 is a nuclear reactor tank, enclosing a core 2 composed of fuel elements 3, carried by one or more grid plates 4. A cylindrical riser 5 is mounted above the core 2. Heavy or light water, or a mixture of heavy and light water is used as coolant. The level of the water is indicated at 6. Control rods 7 are provided for the control of the reactor, merely two such rods being shown in the drawings, in order not to overburden the same. The control rods 7 are, in conventional manner, actuated by drive means for the purpose of moving the same into and out of the core 2. Above the water level 6, there is provided a vapour space 8 which is in communication with an external fluid circulation conduit through a pipe 9 which communicates with a heat exchanger 10 or any other heat utilization apparatus, such as a turbine provided with a condenser. The condensate is pumped from the heat exchanger 10 through pipes 11 and 12 back to the reactor tank by means of a pump 11a, and enters at 13 at the bottom of the tank 1. The pipe 12 may be subdivided into a number of nozzles 13 distributed over the entire inlet of the core 2.

In reactor operation, vapour is generated in the core 2, and water and vapour rise, due to natural circulation, through the riser 5. The vapour is separated from the water, either by natural or forced separation and enters the vapour space 8, while the water returns to the core 2 through the downcomer 14, between the tank wall and the riser 5. The re-circulated water mixes with the return condensate from the pipe 12 at 13 and the mixture passes the fuel elements 3 for re-heating.

For the purpose of stabilizing the flow conditions, a restricted passage 15 is provided in the downcomer 14. This passage is included in the downcomer 14 proper and extends over about one half to three quaters of the length of the downcomer, as calculated from the top of the riser 5 to the bottom of the reactor core 2. A diffusor 16 is arranged at the outlet from the restricted passage 15.

Figure 2:
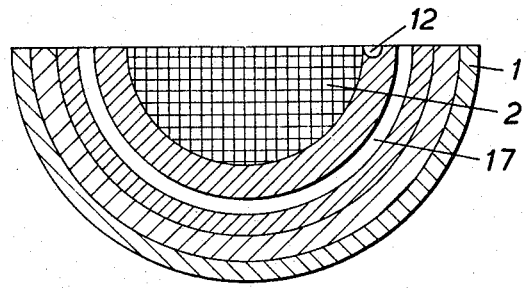
FIGURES 2 to 4 are horizontal views, taken along the line a—a of FIG. 1, in various embodiments.

The restricted passage 15 may be formed in different manners. FIG. 2 illustrates one embodiment, wherein the passage is in the form of an annular space encircling the core 2. The geometrical configuration of the passage depends on the shape of the circumference of the reactor core, which obviously is not necessarily circular. The width of the annular space may vary so as to make the section present parts of mutually different transverse dimensions. It is essential that the passage is positioned underneath the top portion of the downcomer.

The restricted passage 15 is, per se, an effective stabilizing means in a boiling water reactor, but the stabilizing effect may be increased by the provision of means adjusting the flow section of the restricted passage 15. FIG. 1 illustrates, by way of principle, a spring actuated valve 20, movable towards and away from the inlet of the passage 15 in dependence upon the flow velocity in the downcomer. In case an acceleration increase causes an undesired increase in the circulation in the circuit, the increased flow will force the spring 21 downwardly and cause a restriction of the flow section of the inlet to the passage 15, thereby reducing the flow through the same, to effect a circulation decrease.

Figure 3:
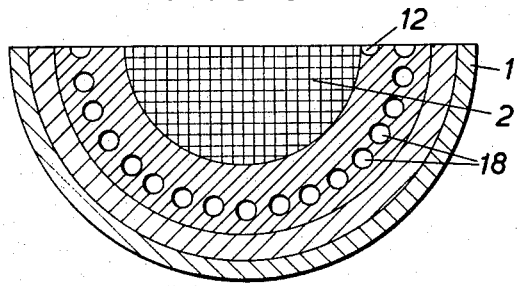

Another embodiment of the restricted passage 15 is shown in FIG. 3. In this case, the passage 15 is in the form of a number of narrow passages 18 distributed around the core 2. In such an arrangement, the adjustment of the flow section of the passage 15 is facilitated.

Figure 4:
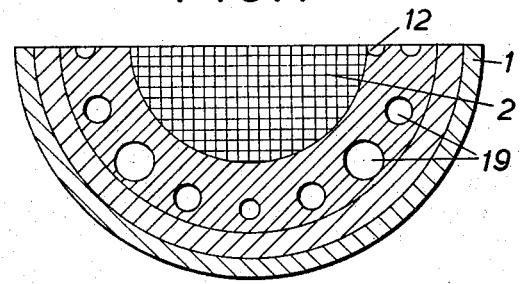

A third embodiment of the restricted passage 15, is shown in FIG. 4. In this case, the passage 15 is in the form of a number of narrow passages 19 of different flow sections, arranged around the core 2. In this manner, pulsations in the flow in the circuit may be checked, and even prevented.

In addition to the stabilizing effect obtained by use of the restricted passage 15, in its various forms, the invention also provides for further stabilization means which are now to be described with reference to the drawings.

In FIG. 1, the pipe 11 is branched at a valve 22, into branches 12 and 23. Through the pipe 23, condensate is fed to the vapour space 8 in a quantity which depends upon the quantity of condensate supplied to the inlet of the reactor core 2 through the pipe 12, the said quantity of condensate supplied to the core 2 being dependent upon the flow velocity through the downcomer. The adjustment is effected by means of the valve 22, which may be gravity actuated or actuated by a motor 24 which is electrically controlled by velocity meter 25 in the downcomer 14.

FIGURE 5 illustrates the principle of a boiling water reactor of 60 megawatt thermal power, operating with water as coolant at a pressure of 50 atmospheres. The flow conditions of the reactor are stabilized essentially by means such as described above with reference to FIGS. 1 to 4, but alternative stabilizing means may be provided, as will appear from the following description.

The reactor tank 26 has an external diameter D of 2.6 m., and a height H of 6.4 m. The total length of the downcomer 27 is 3.42 m., of which the length $l_p$ of the restricted passage 28 is 1 m. and the length $l_d$ of the passage diffuser 29 is 0.84 m. The height $H_c$ of the reactor core 30 is 1.32 m. and the height $H_r$ of the riser 31 is 1.58 m. The water level 32 ordinarily is at a distance $h$ of 0.77 m. above the top of the riser 31. The sectional area $Ar$ of the riser 31 is 1.51 m.$^2$, while the sectional area $Ac$ of the core proper is 1.115 m.$^2$. The sectional area $Ad$ of the top portion of the downcomer 27 is 3.7 m.$^2$, while the area $Ap$ of the lower portion of the downcomer, i.e. of the restricted passage 28 is 0.4 m.$^2$.

As the reactor shown in FIG. 1, the reactor of FIG. 5 is controlled by means of control rods 7 and a vapour space 33 above the water level 32 communicates with a turbine 34 with condensor 34a through a pipe 35. Condensate is returned to the reactor tank 26 by means of a pump 36a through a pipe 36 which, at an adjustable valve 37, is branched into a pipe 38 and a pipe 39. In the embodiment shown, the pipe 38 is passed outside of the tank 26 to the inlet of the core 30, but may also be arranged in the manner shown in FIG. 1. In a further alternative, the pipe 38 may be provided with a number of injectors 40 for the purpose of amplifying the natural circulation in the tank 26. As known, such introduction of condensate provides, per se, a stabilizing effect on the flow condition. In a third alternative, the second branch pipe 39 is extended downwardly into the liquid at the outlet of the core 30, as indicated at 41. As shown, the downward pipe 41 may be branched into a number of pipes 42, to the effect that the condensate flowing through the pipe 39 is fed, not only to the outlet of the core, through the pipe 41, but also to the top of the downcomer 27, through the pipes 42. The valve 37 may be gravity actuated or driven by a motor 43 which is electrically controlled by a velocity meter 44. The gravity actuated valve 37 may also supply electrical signals to a further motor 45 which, through a mechanical connection, may adjust a flap 46 situated in one or more of such passages 18, 19 which are described with reference to FIGS. 3 and 4,, or the flap 46 may be adjusted by signal from the velocity meter 44.

I claim:

1. In a nuclear reactor, including the nuclear core, means interconnected in relatively communicating series relation with said core to define a closed fluid circuit for repeated circulation of fluid through said core, said means including a downcomer adjacent and communicating with the intake side of said core and a riser adjacent and communicating with the discharge side of said core, wherein said downcomer includes a portion having a restricted flow section which is in the form of a passage, such passage being provided with means adapted to adjust the flow section of the passage in dependence upon the flow velocity in the downcomer.

2. A nuclear reactor as claimed in claim 1, wherein the flow section adjustment means also comprises a gravity sensitive device.

3. A nuclear reactor as claimed in claim 1, wherein the flow section adjustment means comprise a flap.

4. A nuclear reactor as claimed in claim 1, wherein the flow section of the passage has a geometrical configuration comprising section parts of mutually different transverse dimensions.

5. A nuclear reactor as claimed in claim 1, wherein the passage of the downcomer presenting a restricted flow section is subdivided into a number of narrow passages.

6. A nuclear reactor as claimed in claim 5, wherein at least some of the said narrow passages have a flow section different from that of the remaining narrow passages.

7. In a nuclear reactor, including the nuclear core, means interconnected in relatively communicating series relation with said core to define a closed fluid circuit for repeated circulation of fluid through said core, said means including a downcomer adjacent and communicating with the intake side of said core and a riser adjacent and communicating with the discharge side of said core, wherein said downcomer includes a portion having a restricted flow section, and including an external fluid circulation conduit extending from, and in communication with, a vapour space above the restricted flow section, through a heat utilizing means to a branching point, and from said point branches extend back into said reactor to above the outlet of the riser and to the inlet of the core.

8. A nuclear reactor as claimed in claim 7, wherein the branch extending to above the outlet of the riser is provided with a number of branches extending into the downcomer.

9. In a nuclear reactor, including the nuclear core, means interconnected in relatively communicating series relation with said core to define a closed fluid circuit for repeated circulation of fluid through said core, said means including a downcomer adjacent and communicating with the intake side of said core and a riser adjacent and communicating with the discharge side of said core, wherein said downcomer includes a portion having a restricted flow section, and including an external fluid circulation conduit extending from, and in communication with, a vapour space above the restricted flow section, through a heat utilizing means to a branching point, and from said point branches extend back into said reactor to the vapour space and to the inlet of the reactor core.

10. A nuclear reactor as claimed in claim 9, wherein a gravity sensitive distribution valve is inserted at the branching point.

11. A nuclear reactor as claimed in claim 9, wherein the branch extending to the inlet of the reactor core is provided with a number of injector nozzles.

References Cited

UNITED STATES PATENTS

| | | | |
|---|---|---|---|
| 2,861,033 | 11/1958 | Treshow | 176—56 |
| 3,087,881 | 4/1963 | Treshow | 176—54 |
| 3,167,480 | 1/1965 | West et al. | 176—56 |
| 3,202,584 | 8/1965 | Bogaardt et al. | 176—61 |
| 3,274,065 | 9/1966 | Kierulf et al. | 176—56 |

BENJAMIN R. PADGETT, *Primary Examiner.*

R. L. GRUDZIECKI, *Assistant Examiner.*

U.S. Cl. X.R.

176—61